(12) United States Patent
Sheppard et al.

(10) Patent No.: US 6,679,425 B1
(45) Date of Patent: Jan. 20, 2004

(54) SYSTEMS, APPARATUS AND PROCESSES TO VERIFY A PERSON'S AGE TO DETERMINE IF THE PERSON IS AUTHORIZED

(75) Inventors: Clinton S. Sheppard, Mountain Home, AR (US); Donald R. McCombes, Laguna Beach, CA (US)

(73) Assignee: Express Technology, Inc., Little Rock, AR (US)

( * ) Notice: Subject to any disclaimer, the term of this patent is extended or adjusted under 35 U.S.C. 154(b) by 944 days.

(21) Appl. No.: 08/877,711

(22) Filed: Jun. 18, 1997

(51) Int. Cl.[7] .................................................. G06K 5/00
(52) U.S. Cl. ..................... 235/382; 235/380; 235/381; 235/375; 235/379
(58) Field of Search .............................. 235/380, 381, 235/382, 375, 379, 385, 449, 487, 493; 902/27

(56) References Cited

U.S. PATENT DOCUMENTS

| | | | | |
|---|---|---|---|---|
| 4,277,837 A | * | 7/1981 | Stuckert | 364/900 |
| 4,341,951 A | * | 7/1982 | Benton | 235/379 |
| 4,945,216 A | * | 7/1990 | Tanabe et al. | 235/462 |
| 4,982,072 A | * | 1/1991 | Takigami | 235/384 |
| 5,042,686 A | * | 8/1991 | Stucki | 221/13 |
| 5,386,103 A | * | 1/1995 | DeBan et al. | 235/379 |
| 5,550,359 A | * | 8/1996 | Bennett | 235/382 |
| 5,649,118 A | * | 7/1997 | Carlisle et al. | 395/241 |
| 5,722,526 A | * | 3/1998 | Sharrard | 235/381 |
| 5,845,256 A | * | 12/1998 | Pescitelli et al. | 235/381 |
| 5,864,623 A | * | 1/1999 | Messina et al. | 380/23 |
| 6,119,932 A | * | 9/2000 | Maloney et al. | 235/380 |

FOREIGN PATENT DOCUMENTS

| | | | |
|---|---|---|---|
| JP | 402127792 | * | 5/1990 |
| JP | 402127732 A | * | 5/1991 |
| JP | 05-304902 | * | 12/1993 |
| JP | 06-236477 | * | 8/1994 |
| JP | 05-28532 | * | 4/1995 |

\* cited by examiner

Primary Examiner—Diane I. Lee
(74) Attorney, Agent, or Firm—R. Darryl Burke; McKool Smith, P.C.

(57) ABSTRACT

A process and apparatus determines whether a person is authorized to purchase a restricted goods, such as tobacco or alcohol, or attend a restricted even, such as a strip tease act or a movie, or receive a certain discount, such as a senior discount. The person has a date of birth and a corresponding age and an identification material, such as a driver's license, having the date of birth encoded on a magnetic strip attached thereto. The date of birth is magnetically read from the magnetic strip attached to the identification material. The apparatus has a magnetic reader, a microprocessor, and a warning device. The magnetic reader reads the date of birth from the magnetic strip attached to the identification material. The microprocessor is electrically coupled to the magnetic reader and programmed to receive the date of birth read and to compute the age by comparing the date of birth to the first date. The first date is inputted into the microprocessor. The microprocessor further compares the age to a standard age to determine whether the person is authorized. The warning device is electrically coupled to the microprocessor and alerts an operator whether or not the person is authorized.

16 Claims, 5 Drawing Sheets

Fig. 5 ns, APPARATUS AND PROCESSES
TO VERIFY A PERSON'S AGE TO
DETERMINE IF THE PERSON IS
AUTHORIZED

PARTIAL WAIVER OF COPYRIGHT
PURSUANT TO 1077 O.G. 22(Mar. 20, 1987)

©Copyright. 1997. Clinton E. Sheppard and Donald R. McCombes. All of the material in this patent application is subject to copyright protection under the copyright laws of the United States and of other countries. As of the first effective filing date of the present application, this material is protected as unpublished material.

However, permission to copy this material is hereby granted to the extent that the owner of the copyright rights has no objection to the facsimile reproduction by anyone of the patent document or patent disclosure, as it appears in the United States Patent and Trademark Office patent file or records, but otherwise reserves all copyright rights whatsoever.

FIELD OF INVENTION

A present invention relates to the field of systems, apparatus, and processes used to quickly determine if the holder of certain information (e.g., a driver's license) is of sufficient age to purchase a restricted product (e.g., alcohol, tobacco products, sexually oriented magazines), to attend a restricted event (e.g., a movie, a rock concert, or a topless club), to participate in a certain activity (e.g., rent a car), or to receive age based discounts (e.g., senior citizen discounts).

BACKGROUND

The protection of our youth from certain evils is an ever-present societal concern. For instance, under-age drinking and consumption of tobacco products has become a major problem over the past several years. Minimum age limits are routinely adopted and established by the local, state, and federal governments to prevent underage people from purchasing certain products (e.g., tobacco and alcohol), attending certain events (e.g., movies, a rock concert, or a topless club), participating in a certain activity (e.g., rent a car), or to receive an age based discount (e.g., senior citizen discounts). Businesses providing these products and discounts or conducting these events must enforce the age restrictions or face serious legal consequences. Unfortunately, however, the enforcement process has been difficult to implement, because, in part, it must be enforced by each sales clerk or attendant at each theater, topless club, convenience store, grocery store, bar, liquor store, etc. throughout the country. These people are currently required to compute a person's age from information provided on a driver's license (or similar form of identification) and then compare the person's age to the age set by the government that allows one to drink alcohol products, consume tobacco products, see a movie, enter a topless club, receive a discount, etc. While helping other customers, these sales clerks or attendants are often required to quickly compute the age of the customer without the help of a pencil and paper, much less a calculator. Moreover, this process is further complicated by the fact that the minimum age to purchase alcohol is often different from the minimum age to purchase cigarettes, the minimum age to attend a restricted movie, and the minimum age to receive a discount. Furthermore, the minimum age for each of these activities varies throughout the country. In view of the above circumstances, it is not surprising that these sales clerks and/or attendants sometimes make mistakes. And, if an underage person illegally buys alcohol and has a car wreck injuring himself and/or others, these errors can be disastrous to the sales clerk and/or attendant and the owner and operator of the business as well as to the person that the laws establishing the minimum age were intended to protect.

SUMMARY

Preferred systems, apparatus, and processes determine whether a person is authorized on a specific day to purchase restricted products, such as alcohol or tobacco products, to attend restricted events, such as a movie, a strip tease act, to participate in a certain activity and/or to receive certain discounts, such as senior citizen discounts. At the moment, a significant number of states issue driver's licenses having a magnetic strip with information about the driver contained thereon, such as the driver's name, the driver's birth date, the driver's driver number, the driver's address, etc. Preferred embodiments read this information from the magnetic strip, compute the driver's age, compare the driver's age to minimum ages established by local, state, and federal governments to purchase certain restricted products or to attend certain restricted events, and notifies the operator whether the driver is old enough to purchase the restricted products or to attend certain restricted events.

Specifically, preferred processes are generally comprised of the following steps: (a) inputting the date of birth of the person; (b) computing the age; (c) comparing the age to a standard age to determine whether the person is authorized or not; and (d) notifying or informing an operator whether or not a person is authorized. In particular, the date of birth is often inputted by magnetically reading the date of birth from a magnetic strip on some sort of an identification document (e.g., the person's driver's license). Alternatively, the date of birth could be manually entered. The standard age establishes a minimum age to purchase alcohol products and tobacco products, to attend a strip tease act or a movie, or to receive certain discounts. The age is generally computed by comparing the date of birth to the date of inquiry (e.g., today's date). Once the age is computed, the age is compared to the standard age by determining whether the age is less than the standard age or greater than or equal to the standard age. The operator can be notified by outputting the information to a display (e.g., a Liquid Crystal Display), lighting one or more lights, or emitting certain sound or sounds.

Preferred apparatus are generally comprised of a input device, a microprocessor controller, a warning device and/or a display mechanism. The input device, warning device and/or display mechanism are electrically coupled to the microprocessor controller. A magnetic reader is preferably used to read the date of birth (and any other additional information) from the magnetic strip attached to a person's identification card or document, such as a driver's license. The date of birth and other information is preferably encoded in the magnetic strip. The microprocessor controller is programmed to receive the date of birth and to compute the age of the person by comparing the date of birth to the date of inquiry (e.g., today's date), which is supplied to the microprocessor controller. For instance, the date of inquiry can be supplied to the microprocessor controller with a series of control switches. The date of inquiry can be stored along with the program operating the microprocessor controller in memory accessible by the microprocessor controller. The microprocessor controller effectively can also act like a digital clock, so that the date of inquiry need not always be entered. Rather, the date and time needs to only be entered or set once.

After the age of the person is determined, the microprocessor controller then compares the age to a standard age to determine whether the person is authorized to purchase certain goods and/or to attend certain events. Once the microprocessor controller has determined whether or not the person is of sufficient age, the microprocessor controller may trigger a warning device, such as at least one light and/or at least one buzzer, to inform an operator whether or not the person is authorized. The microprocessor controller may also display a message informing the operator of the results of its analysis. The warning device in preferred embodiments is comprised of a first light and a second light, both of which are electrically coupled to the microprocessor controller, and a buzzer, which is also electrically coupled to the microprocessor controller. The first light is preferably red and the second light is preferably green. The microprocessor controller lights the first light and/or sounds the buzzer when the person is not authorized and the microprocessor controller lights the second light when the person is authorized and/or sounds the buzzer. Alternative preferred embodiments use one light, so that the microprocessor controller lights the light and/or sounds the buzzer when the person is authorized or vice versa. Other alternate preferred embodiments may use a first light (e.g., a red light) to signal whether the person was of sufficient age to purchase alcohol and a second light (e.g., a green light) to signal whether the person was of sufficient age to purchase tobacco. As a result, the alternate preferred embodiment that uses two lights to signal authorizations for different reasons is, thus, capable of simultaneously providing immediate authorization information. In preferred embodiments in which only one light is used (or one light for each determination), a blinking light indicates authorization was granted; a non-blinking light indicates authorization was not granted.

Preferred embodiments may also be comprised of a power source (e.g., battery, rechargeable battery, or power transformer mounted to an electrical outlet) to power the magnetic reader, the microprocessor controller, and the warning device. The microprocessor controller may also have a serial data communication port (e.g., RS232 interface) electrically coupled to the microprocessor controller to output the age to a personal computer, electronic cash register, etc. If the magnetic reader reads the additional information pertaining to the person from the magnetic strip or the additional information is otherwise supplied, this information can be outputted along with the age of the person via the serial data communication port.

There are a number of advantages of the preferred processes, systems, and apparatus discussed above. Specifically, the preferred embodiments reduce errors in the computation of a person's age and in the corresponding authorization of a specific purchase by that person of a restricted item, entrance by that person to a restricted event, participation in a certain activity, or purchase of a specific item or service at a discounted rate. In addition, the information pertaining to a specific purchase or entry can be stored electronically in a personal computer, etc. Also, the use of batteries keep the overall embodiment functional during power failures by the public utility service. In addition, it is possible to use the product in a portable mode with the power transformer disconnected, because the batteries provide temporary power. Consequently, when used as a portable device, preferred embodiments can be used in such environments as a darkened bar.

Other advantages will be explained in greater detail below.

BRIEF DESCRIPTION OF THE DRAWINGS

The accompanying drawings are incorporated into and form a part of the specification to illustrate several examples of the present inventions. These drawings together with the description serve to explain the principles of the inventions. The drawings are only for the purpose of illustrating preferred and alternative examples of how the inventions can be made and used and are not to be construed as limiting the inventions to only the illustrated and described examples. Further features and advantages will become apparent from the following and more particular description of the various embodiments of the invention, as illustrated in the accompanying drawings, wherein.

DETAILED DESCRIPTION OF THE PREFERRED EMBODIMENT

The present inventions will be described by referring to systems, apparatus, and methods showing various examples of how the inventions can be made and used. When possible, numbers identifying related or similar items will be reused in subsequent drawings.

Figure 1:
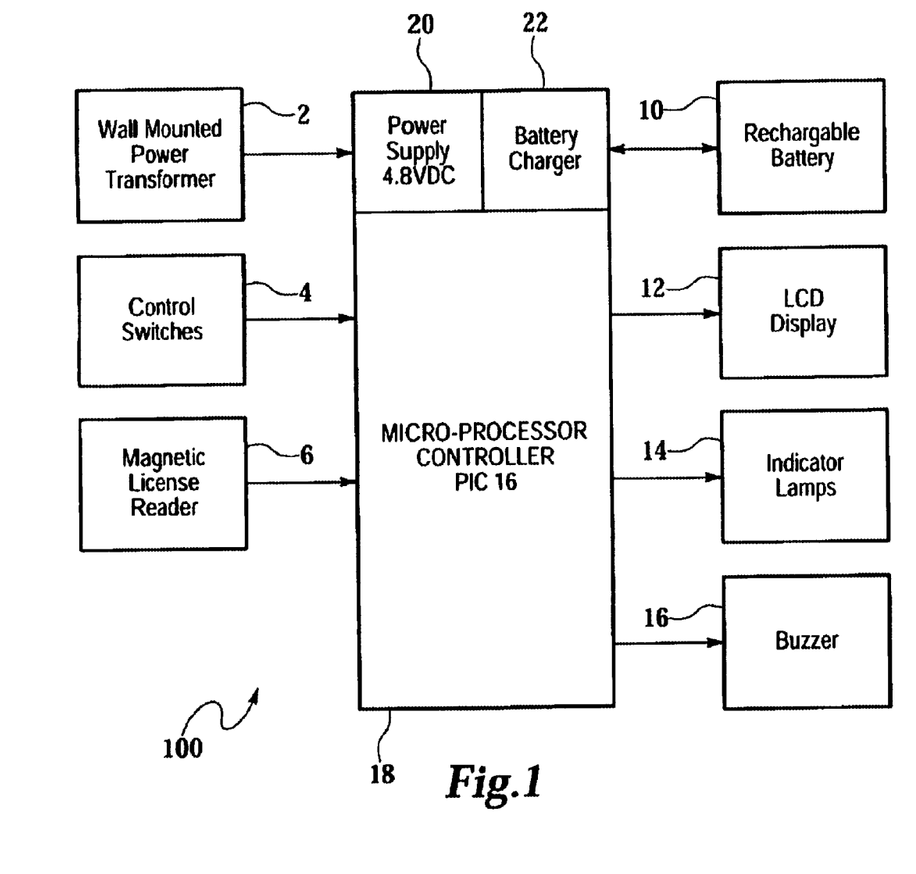
FIG. 1 is a system diagram of a preferred embodiment 100.
Figure 2:
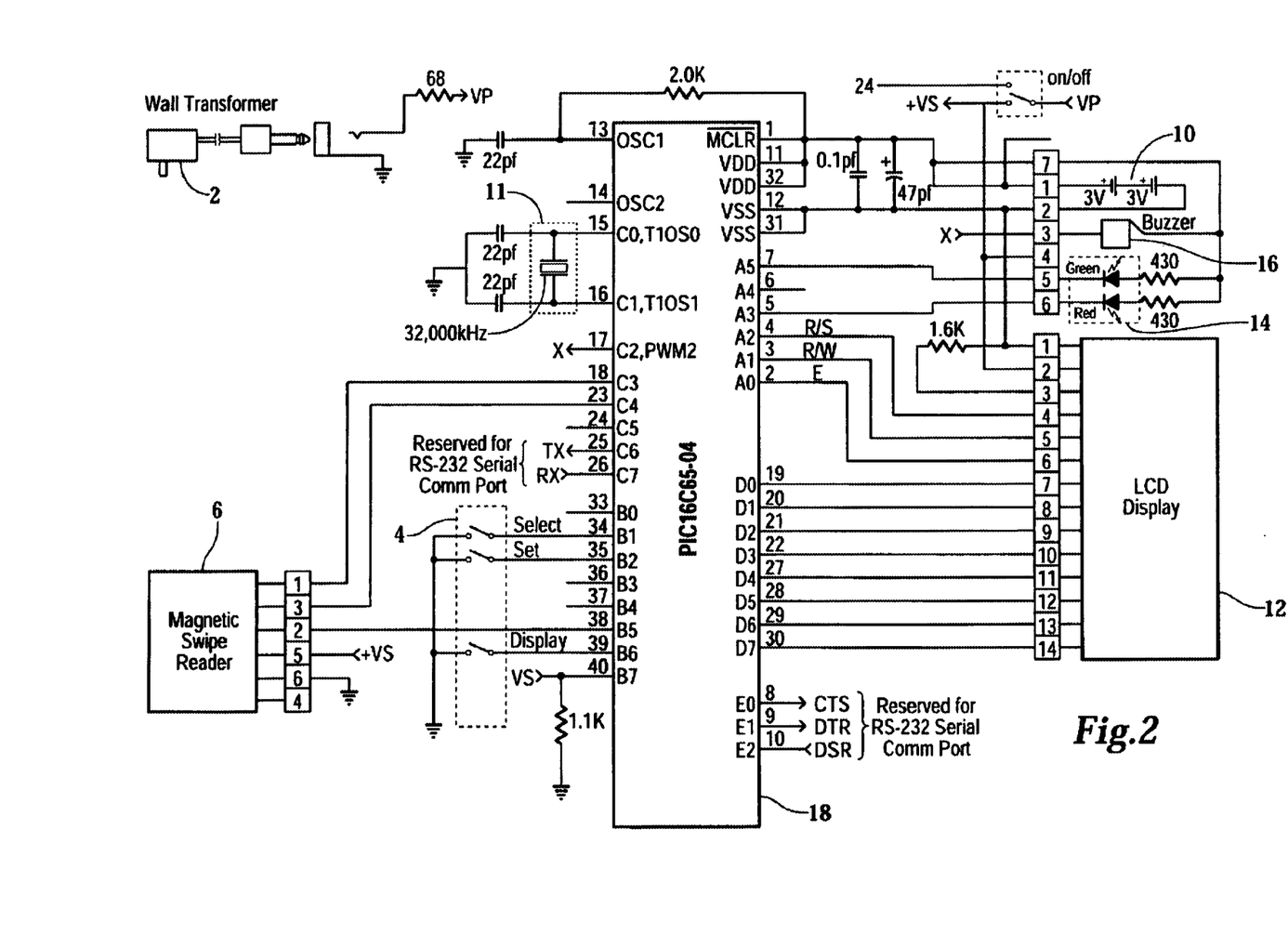
FIG. 2 is a detailed schematic of a preferred embodiment 100 of the system diagram shown in FIGS. 1 and 5.
Figure 5:
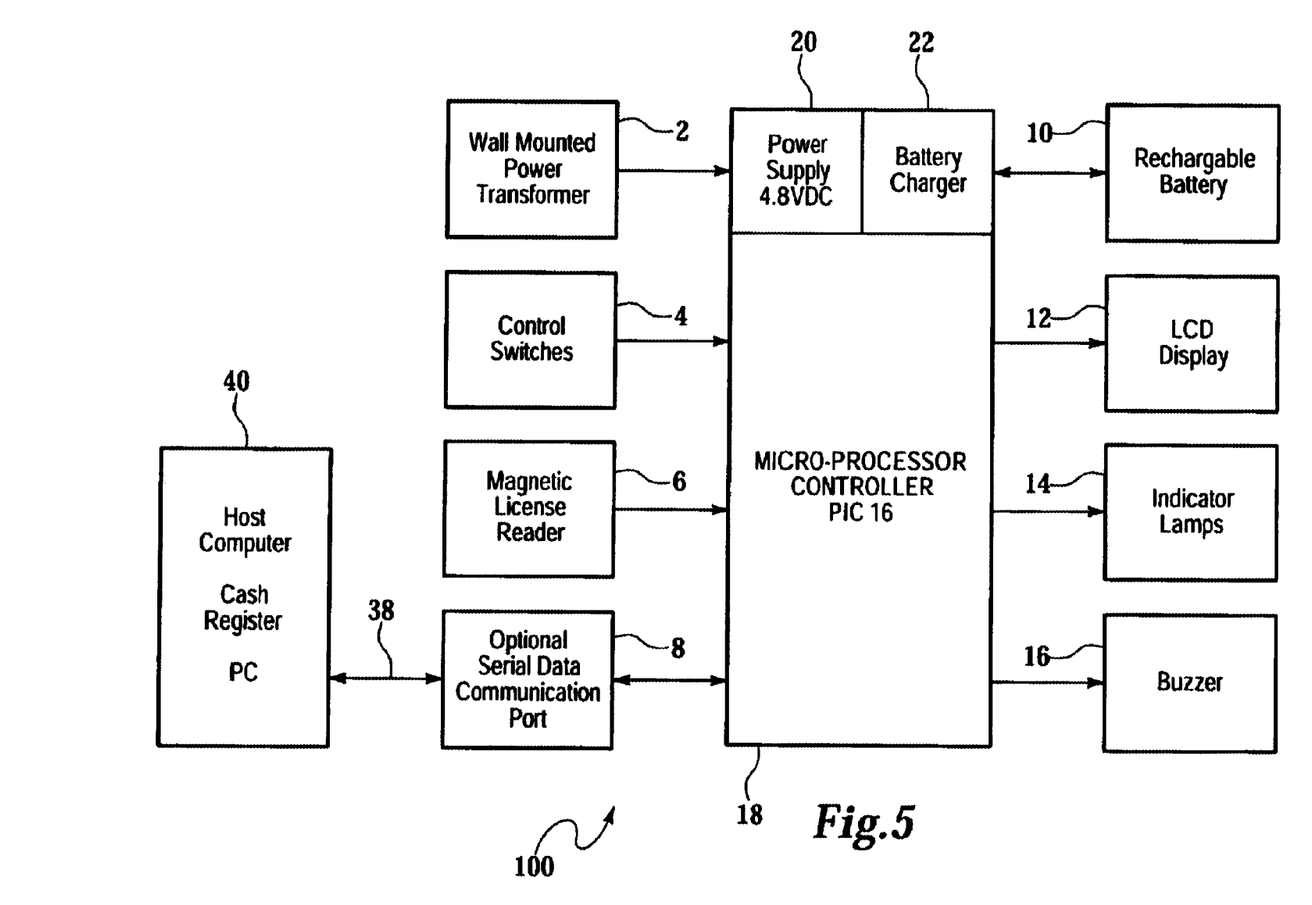
FIG. 5 is an illustration of a system configuration in which a preferred embodiment 100 is linked to personal computer, host computer, or cash register 40.

FIG. 1 is a system diagram of the preferred embodiment 100. FIG. 5 is an illustration of a system configuration in which a preferred embodiment 100 is linked to a personal computer, host computer, or cash register 40 via cable 38 and optical serial data communication port 8. This allows the data corresponding to the event in which an age verification has been requested to be stored or supplied to other systems for other purposes. FIG. 2 is a detailed schematic of the system diagram shown in FIGS. 1 and 5. Specifically, without going into the details shown in the schematic illustrated in FIG. 2, wall mounted power transformer 2 is electrically coupled to power supply 20 (e.g., 4.8 VDC) and to battery charger 22 and to rechargeable battery 10, all of which combine to power the overall system 100.

Control switches 4 are used to manually set the present date, the present time and input the minimum age for each of two separate events (e.g., the minimum age for purchasing alcohol and the minimum age for purchasing tobacco products) into microprocessor controller 18. Magnetic license reader 6 reads the date of information (and any other desired information) from magnetic strip 610 (in FIG. 6B), which is attached to some form of identification, such as driver's license 600 (in FIGS. 6A and 6B). If the identification document is driver's license 600, then the visual identification information is generally shown on one side (e.g., front) of the driver's license 600 and magnetic strip 610 is generally placed on the a second side (e.g., back) of the driver's license 600. Magnetic license reader 6 is electrically coupled to microprocessor controller 18 and inputs the date of birth of the person (and any other information pertaining to the person) into microprocessor controller 18. Serial data communication port 8 is also electrically coupled to microprocessor controller 18 to output the age of the person once computed as well as any other information, such as the person's name, driver's license number, social security number, the date and time of purchase, etc. to a host computer, personal computer, or cash register 40 via cable 38. Display 12 (e.g., LCD) is also electrically coupled to microprocessor controller 18 to display the information discussed below. Indicator lamps 14 are electrically coupled to microprocessor controller 18 to display information pertaining to whether the person has been authorized or not. Buzzer 16 is also electrically coupled microprocessor controller 18 to signal whether the person has been authorized or not.

Preferred embodiments use MicroChip's PIC16C65A-04/L for microprocessor controller 18, the data book of which is incorporated by reference. A PIC16C65A-04/L acts as digital clock, which is maintained by a crystal controlled PIC16C65A-04/L running under interrupts. Crystal 11 is shown in FIG. 2. Note that there are a multitude of microprocessors that could have be used in this application, but preferred embodiments use a microprocessor capable of supporting interrupts such that a crystal controlled clock can be used to accurately keep track of the time of day and date. Other embodiments may use circuitry external to microprocessor controller 18 to perform these functions, such as a clock/calender integrated circuit which would keep track or time and date without intervention from microprocessor controller 18, which would then interrogate the clock/calender integrated circuit when the time or date is required by the verification software.

Preferred embodiments use an liquid crystal display ("LCD") type alpha numeric display module capable of displaying two rows of text, such as that manufactured by Optrex (e.g., PN#DMC-50448N), for display 12. Preferred embodiments also use a magnetic license reader 6 capable of reading track #2 of a magnetic stripe 610 (in FIGS. 6A and 6B) and with built in data detection circuitry, such as that manufactured by Magtek (e.g., 21050002). Preferred indicator lamps 34 and 36 are LED types. Preferred audible buzzer 16 should be capable of emitting sound in excess of 70 dbm, which are instructed by microprocessor controller 18 to "beep" for ¼ second if magnetic stripe 610 was read incorrectly. Buzzer 16 can be programmed to beep for some other reason if desired. Buzzer 16 is preferably contained inside enclosure 26. Preferred embodiments of buzzer 16 emits sound at 70 db–96 db. Preferred batteries 10 are rechargeable Nickel Cadmium (NiCd) type, but other types, such as Lithium, can be used as well.

Preferred embodiments prefer the battery pack having JBRO PN#1T1339 TP-4-4/280DKS-B. Preferred embodiments use a Liton PN#L1083 for a green LED and a Liton PN# L1081 for the red LED.

Figure 4A:
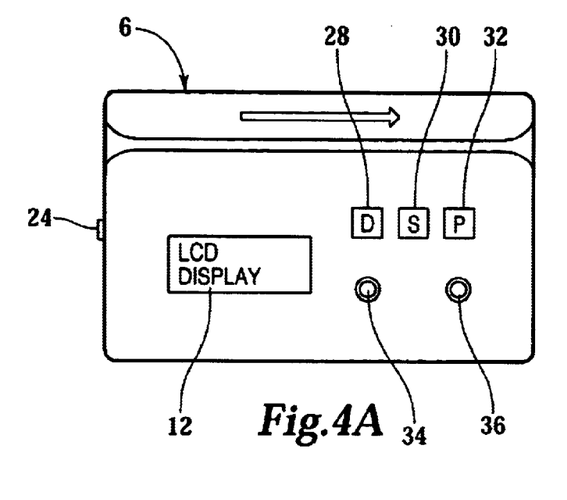
FIGS. 4A, 4B, and 4C are illustrations of a preferred embodiment 100 of the system shown in FIGS. 1 and 5 when protected by and generally encapsulated within enclosure 26.
Figure 4B:
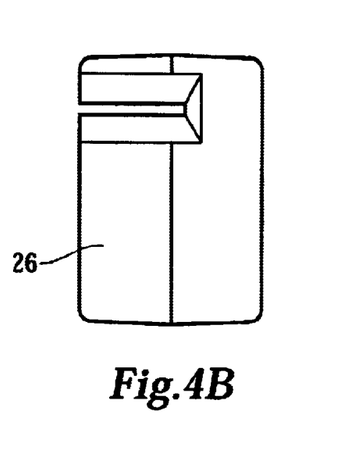
Figure 4C:
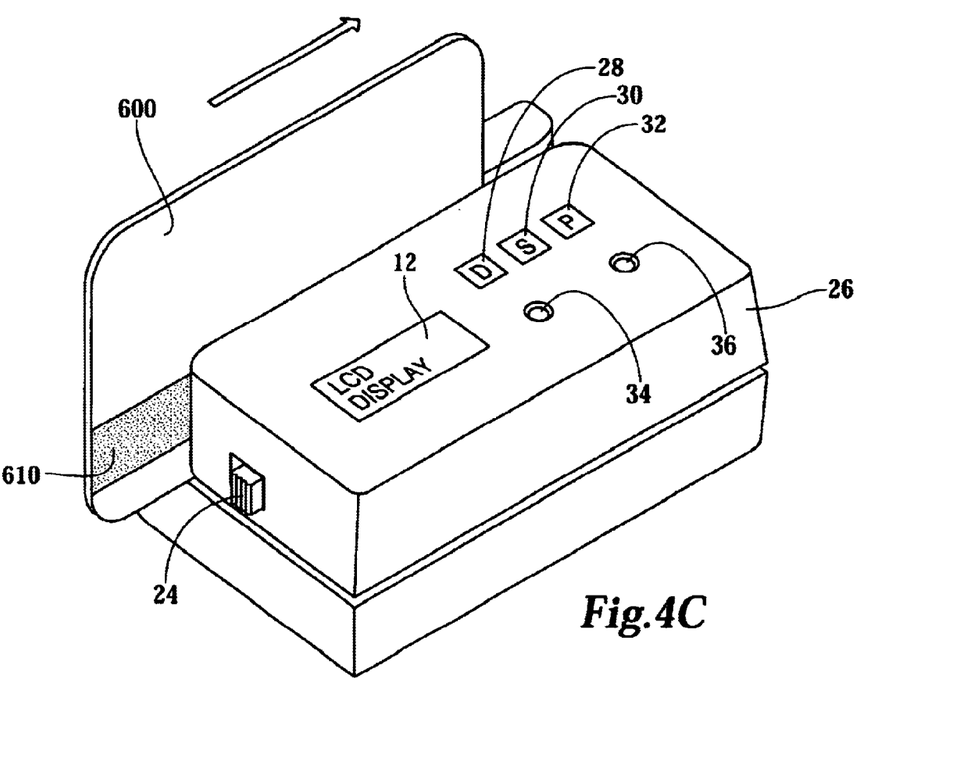

"On/Off" switch 24 is located on the left side of enclosure 26 shown in FIGS. 4A, 4B, and 4C. When "On/Off" switch 24 is in the "ON" position, the preferred embodiment is fully functional. The "OFF" position is used to conserve power and extend battery life when the preferred embodiment is operated as a portable device without being connected to the wall transformer 2 (in FIGS. 1, 2, and 5). When the preferred embodiment is plugged into the wall transformer 2, batteries 10, when rechargeable, are trickle charged. If batteries 10 are not used, the "ON/OFF" switch 24 can be removed. Note to ensure maximum battery life, it is important to make sure that display 12 is blank before turning the preferred embodiment "OFF." "ON/OFF" switch 24 must be "ON" in order to activate these switches. Preferred embodiments have the following buttons: "Display" or "D" button 28 which causes the display to be active; "Select" or "S" button 30 which allows the user to select the data to be altered; and "Preset" or "P" button 32 which allows the user to change the selected data. These buttons are recessed below the surface of enclosure 26 shown in FIGS. 4A, 4B, and 4C, so that they will not be accidently activated. The function of these switches is to allow the user to set the time and date and, the legal age to purchase restricted products, attend restricted events, etc., perform certain activities or receive certain discounts, which vary from state to state, city to city, company to company. Time of day is not preferably displayed (in part because it is not needed nor relevant). To conserve power, display 12 is not generally active until the operator presses "Display" or "D" button 28, which turns on microprocessor controller 18. When microprocessor controller 18 is turned on and display 12 is activated, the current time will be displayed in the following format" hours/minutes/seconds. A blinking cursor will appear at the hour digits. The leading zeros are suppressed in preferred embodiments. If the operator presses the "Display" or "D" button 28 again, display 12 will be cleared. If instead of pressing the "D" button 28, the operator presses the "S" button 30, the cursor will move to the minute digits and, if the operator presses the "S" button 30 a second time, the cursor will move to the second digits. The operator can cause the numbers at the location of the cursor to rapidly sequence through all possible values for the field where the cursor is located by pressing and holding the "P" button 32 active. If the operator presses the "S" button 30 while the cursor is over the seconds digits the current time will be erased and the present date will be displayed with the cursor positioned over the month digits. If the operator presses the "S" button 30 again, the courser will move to the day digits. On the next activation of the "S" button 30, the cursor will move to the year digits. When "Select" or "S" button 30 is pressed the fourth time, display 12 will show the following image:

Alcohol

Age: 21

Since the age varies throughout the country, the age "21" is variable. In this instance, the cursor will be turned on over the "1." Furthermore, if "Select" or "S" button 30 is pressed a fifth time, display will show the following image:

Tobacco

Age: 18

Once again, since the age varies throughout the country, the age "18" is variable and can be changed. In this instance, the cursor will be blinking over the "8." Any time the cursor is blinking over a number, that number can be changed by pressing "Preset" or "P" button 32. As long as "Preset" or "P" button 32 is pressed the digits in the data field will increment through all possible values for that data. After the data has been set, the operator presses "Display" or "D" button 28 again and display 12 returns to the Month/Day/Year presentation and holds "Display" or "D" button 28 for a specified period of time (e.g., 5 seconds) before turning off or deactivating display 12. Note the hour of the day is expressed as a number from 1 to 23. This is the IDLE state of the unit.

Figure 6A:
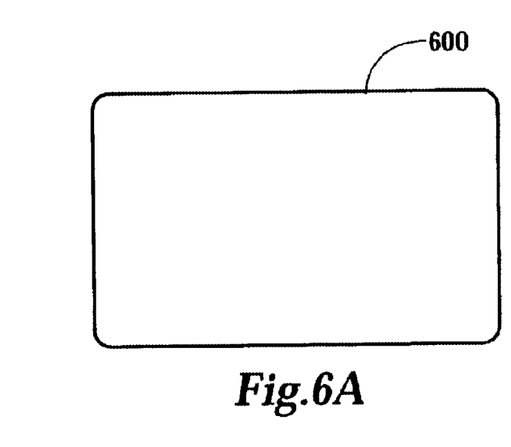
FIGS. 6A and 6B are illustrations of identification document 600 having a magnetic strip 610.
Figure 6B:
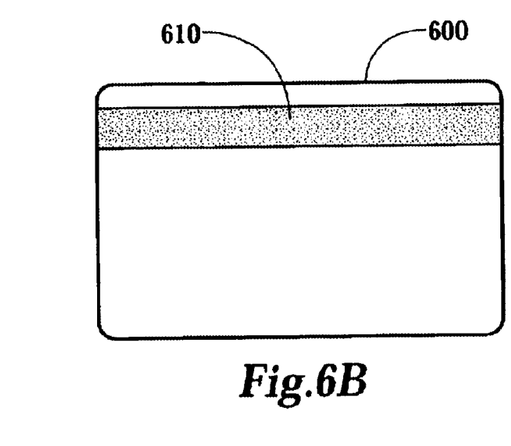

When an identification card or document 600 with magnetic strip 610 with encoded date of birth information (e.g., driver's license) is swiped through magnetic license reader 4, the data retrieved from the magnetic strip 610 by magnetic license reader 6 and transferred to microprocessor controller 18. Microprocessor controller 18 sorts the data retrieved by the magnetic license reader 6 to find the date of birth. Then, using the date of birth, microprocessor controller 18 calculates the age of the person having the date of birth and compares that age to the required or standard age for purchasing (and/or consuming) restricted products (e.g., alcohol or tobacco products), attending restricted events (e.g., movies, strip tease acts), performing other events (e.g., renting a car, driving a car), and/or receiving a certain discount (e.g., senior discount). In particular, a program, such as that shown in Appendix A, instructs microprocessor controller 18 to compare the date of birth to a software maintained calendar and clock to determine the age from the date of birth information. If the person having the date of birth read is of sufficient age, then one or both of indicator lamps 34 and 36 will blink for 3 seconds. The indicator lamp used to relay alcohol authorization information is preferably red and the indicator lamp used to relay tobacco authorization information is preferably green. That way they are easily distinguished in a darkened bar room. If the licensee is of age to purchase tobacco or alcohol, the LED for that commodity will be lighted otherwise, an alternate light will be lighted and buzzer 16 will be activated to notify the operator that the sale may be denied. If an error is detected while reading the magnetic stripe 610, buzzer 16 will be made to emit a short beep sound to notify the operator of the error.

Also, note that preferred embodiments can also read and display up to 40 characters from track #2 on any card 600 with magnetic stripe 610. When the unit is in this mode, it does not check the age or perform any operation on the data other than to display it on display 12. In order to make the unit into a card reader instead of an age verification unit or to switch back from a card reader to a age verifier do the following procedures. While in the IDLE state, depress and hold the "P" switch active while you depress and release the "Display" or "D" button 28. When in the card reader mode, use the "S" button 30 and "P" button 32 to scroll through the data. In the card reader mode, microprocessor controller 18 will only accept up to 40 characters but will stop if a stop character is encountered before 40 characters have been read. Some cards may have fewer than 40 characters recorded. The following symbols will aid in interpreting the data obtained in this mode:

; The semicolon is a start sentinel.
= The equal sign is a separator character used to denote the end of a filed of data.
? The question mark is the stop character and it is the last character to be read.

Figure 3:
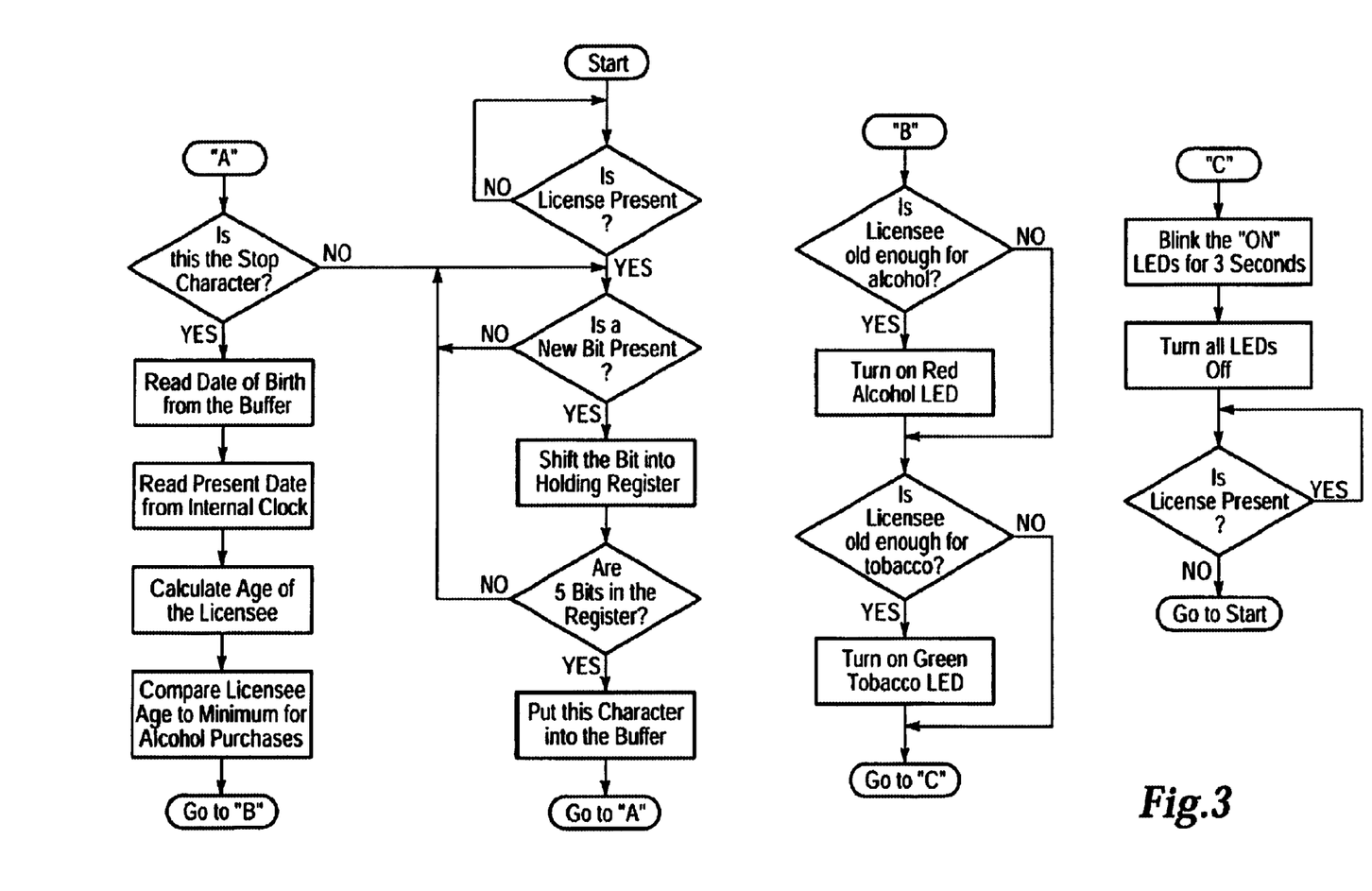
FIG. 3 is a flow chart outlining the series of steps of a preferred process, which is preferably implemented with the system diagram shown in FIGS. 1 and and the schematic diagram shown in FIG. 2.

FIG. 3 is a flow chart outlining the series of steps of a preferred process used to read the information from the identification document 600, compute the age of the person to whom the identification document 600 refers, and comparing the age to the standard ages, which is preferably implemented with the system diagrams shown FIGS. 1 and 5 and the schematic diagram shown in FIG. 2.

Specifically, the column under the word "start" is primarily comprised of steps needed to read the data present on magnetic strip 610 and store the corresponding characters in a buffer. The column under the letter "A" generally retrieves the date of birth information, calculates the-age of the person to whom the identification document refers, and compares the age to the standard age. The column identified by the letter "B" generally notifies the operator of the results of this process. Referring to the "start" column, five (5) bits are generally assigned to each character and the entire string of characters is preferably read into memory until the stop character is read and identified. Referring to the column under the letter "A," after all of the characters are read are placed into a buffer, the date of birth information is read or retrieved from the buffer. The date of birth is generally the last information found in the string of data. Then, preferred embodiments read the preset date from the internal clock and the age of the person to whom the information refers is calculates and compared to the standard age(s). Referring to Column "B," various lights are activated, depending upon the results of the comparison. Specifically, first light 34 (e.g., a red light) in FIGS. 4A, 4B, and 4C is used to signal whether the person was of sufficient age to purchase alcohol and a second light 36 in FIGS. 4A, 4B, and 4C (e.g., a green light) is used to signal whether the the person was of sufficient age to purchase tobacco. Consequently, multiple authorizations can be determined and signaled for a variety of different reasons and are, thus, capable of simultaneously providing immediate authorization information. In preferred embodiments in which only one light was used, a blinking light indicated authorization was granted; a non-blinking light indicated authorization was not granted. Referring to the column "C," "on" lights are blinked on and off and then turned off and it is determined whether the license is present or not.

FURTHER MODIFICATIONS AND VARIATIONS

Although the invention has been described with reference to a specific embodiment, this description is not meant to be construed in a limiting sense. The example embodiments shown and described above are only intended as an example. Various modifications of the disclosed embodiment as well as alternate embodiments of the invention will become apparent to persons skilled in the art upon reference to the description of the invention. For instance, while specific makers and product types of equipment were specified above, other makers and product types may be used in certain circumstances as well.

Thus, even though numerous characteristics and advantages of the present inventions have been set forth in the foregoing description, together with details of the structure and function of the inventions, the disclosure is illustrative only, and changes may be made in the detail, especially in matters of shape, size and arrangement of the parts within the principles of the inventions to the full extent indicated by the broad general meaning of the terms used in the attached claims. Accordingly, it should be understood that the modifications and variations suggested above and below are not intended to be exhaustive. These examples help show the scope of the inventive concepts, which are covered in the appended claims. The appended claims are intended to cover these modifications and alternate embodiments.

In short, the description and drawings of the specific examples above are not intended to point out what an infringement of this patent would be, but are to provide at least one explanation of how to make and use the inventions contained herein. The limits of the inventions and the bounds of the patent protection are measured by and defined in the following claims.

What is claimed:

1. A process of determining whether a person is older than a first minimum age on a first date and whether said person is equal to or older than a second minimum age on said first date and notifying an operator, said person having a date of birth and an identification card having said date of birth encoded in a magnetic strip attached thereto, said person having an age, comprising:

(a) magnetically reading said date of birth from said magnetic strip attached to said identification card;

(b) computing said age of said person by subtracting said date of birth from said first date;

(c) comparing said age to said first minimum age to determine whether said age is equal to said first minimum age and if said age is equal to said first minimum age, then notifying said operator that said person is said first minimum age;

(d) comparing said age to said first minimum age to determine whether said age is greater than said first minimum age and if said age is greater than said first minimum age, then notifying said operator that said person is older than said first minimum age, (e) comparing said age to said second minimum age to determine whether said age is equal to said second minimum age and if said age is equal to said second minimum age, then notifying said operator that said person is said second minimum age; and (f) comparing said age to a second minimum age to determine whether said age is greater than said second minimum age and if said age is greater than said second minimum age, then notifying said operator that said person is older than said second minimum age.

2. The process of claim 1, wherein said first minimum age is used by said operator to determine if said person can legally purchase a first good and said second minimum age is used by said operator to determine if said person can legally purchase a second rood, said first good and said second Rood selected from a group consisting of alcohol products and tobacco product.

3. The process of claim 1, wherein said first minimum age is used by said operator to determine whether said person can legally attend a first certain event and said second minimum age is used by said operator to determine whether said person can legally purchase a good, said first event selected from a first group consisting of a strip tease act and a movie, said good selected from a second group of alcohol products and tobacco products.

4. The process of claim 1, wherein said identification card is a driver's licence.

5. The process of claim 1, wherein said minimum age determines whether said person is permitted to receive a discount.

6. An apparatus to determining whether a person is authorized at a first date, said person having a date of birth and an identification material having said date of birth encoded on a magnetic strip attached thereto, said person having an age, comprising:

(a) a magnetic reader to read said date of birth from said magnetic strip attached to said identification material;

(b) a first warning device and a second warning device; and (c) a microprocessor electrically coupled to said magnetic reader, said first warning device, and said second warning device, said microprocessor programmed to receive said date of birth read and to compute said age by comparing said date of birth to said first date, said first date inputted into said microprocessor, said microprocessor further compares said age to a first standard age to determine whether said person is authorized and, if said person is authorized according to said first standard age, then said microprocessor activates said first warning device to alert an operator whether or not said person is authorized, said microprocessor further compares said age to a second standard age to determine whether said person is authorized and, if said person is authorized according to said second standard age, then said microprocessor activates said second warning device to alert said operator whether or not said person is authorized.

7. The apparatus of claim 6, wherein said first warning device and said second warning device are selected from a group consisting of a light and a buzzer.

8. The apparatus of claim 6, wherein said first standard age establishes a minimum age to purchase alcohol and said second standard age establishes a minimum age to purchase tobacco.

9. The apparatus of claim 6, wherein said identification material is a driver's license.

10. The apparatus of claim 6, further comprising:

(d) a power source to power said magnetic reader, said microprocessor, said first warning device and said second warning device, said power source electrically coupled to said microprocessor, said first warning device, and said second warning device.

11. The apparatus of claim 6, further comprising:

(d) a serial data communication port electrically coupled to said microprocessor to output said age.

12. The apparatus of claim 11, further wherein said magnetic reader reads additional information pertaining to the person and said magnetic reader reads said additional information and said microprocessor outputs said additional information along with said age via said serial data communication port.

13. The apparatus of claim 6, further comprising:

(d) a display device electrically coupled to said microprocessor controller to output said age to notify said operator.

14. The apparatus of claim 12, wherein said display device is an LCD display.

15. A process of determining whether a person is authorized at a first date, said person having a date of birth and an identification material having said date of birth encoded on a magnetic strip attached thereto, said person having an age, comprising:

(a) magnetically reading said date of birth from said magnetic strip attached to said identification material;

(b) computing said age by subtracting said date of birth from said first date;

(c) comparing said age to a first standard age to determine whether said person is authorized according to said first standard age and comparing said age to a second age to determine whether said person is authorized according to said second standard age;

(d) notifying an operator if said person is authorized according to said first standard age and notifying said operator is person is not authorized according to said first standard age; and (e) notifying an operator if said person is authorized according to said second standard age and notifying said operator is person is not authorized according to said second standard age.

16. The process of claim 15, wherein said first standard age establishes a minimum age to purchase a first good and said second standard age establishes a minimum age to purchase a second good.

* * * * *